United States Patent
Post et al.

(10) Patent No.: US 8,042,578 B2
(45) Date of Patent: Oct. 25, 2011

(54) SYSTEM AND METHOD FOR MAKING PAINTS FROM PREPAINTS

(75) Inventors: Robert Post, Ivyland, PA (US); Ta-Jung Weng, Huwei (TW); Tsey-Jiann Yang, Chiayi (TW)

(73) Assignee: Rohm and Haas Company, Philadelphia, PA (US)

( * ) Notice: Subject to any disclaimer, the term of this patent is extended or adjusted under 35 U.S.C. 154(b) by 954 days.

(21) Appl. No.: 12/008,842

(22) Filed: Jan. 15, 2008

(65) Prior Publication Data

US 2008/0195250 A1    Aug. 14, 2008

Related U.S. Application Data (60) Provisional application No. 60/880,589, filed on Jan. 16, 2007.

(51) Int. Cl.
*B65B 3/26* (2006.01)

(52) U.S. Cl. ............... 141/83; 141/105; 141/95; 141/2; 141/198; 222/58; 222/394

(58) Field of Classification Search ........... 141/2, 18, 141/83, 94, 95, 105, 104, 100, 198; 222/56, 222/58, 77, 394
See application file for complete search history.

(56) References Cited

U.S. PATENT DOCUMENTS

| | | | |
|---|---|---|---|
| 5,040,699 A * | 8/1991 | Gangemi ............... | 222/1 |
| 6,531,537 B2 | 3/2003 | Friel et al. | |
| 6,637,471 B2 * | 10/2003 | Luehrsen et al. ...... | 141/83 |
| 6,689,824 B2 | 2/2004 | Friel et al. | |
| 6,921,432 B2 | 7/2005 | Nungesser et al. | |
| 6,969,190 B1 | 11/2005 | McClain et al. | |
| 6,991,004 B2 * | 1/2006 | Kaufhold et al. ...... | 141/83 |
| 7,065,429 B1 | 6/2006 | McClain et al. | |
| 2003/0232913 A1 | 12/2003 | Bakule | |
| 2005/0038557 A1 | 2/2005 | Friel et al. | |
| 2008/0257446 A1 | 10/2008 | Oakes | |

FOREIGN PATENT DOCUMENTS

| | | |
|---|---|---|
| CN | 2377211 Y | 5/2000 |
| WO | WO 2006/040033 A1 | 4/2006 |

\* cited by examiner

*Primary Examiner* — Gregory Huson
*Assistant Examiner* — Jason Niesz
(74) *Attorney, Agent, or Firm* — Marcella M. Bodner (57) ABSTRACT

A manufacturing system for making paints from prepaints, along with a method related thereto.

15 Claims, 6 Drawing Sheets

SYSTEM AND METHOD FOR MAKING PAINTS FROM PREPAINTS

This patent application claims the benefit of the earlier filing date of prior filed co-pending provisional application Ser. No. 60/880,589 filed on Jan. 16, 2007 under 37 CFR 1.78(a)(4).

The present invention relates to a manufacturing system for paints from prepaints, and a method related thereto.

Formulating paints is a complex matter which involves the careful selection and mixing of various paint ingredients in different ratios, depending on the type of paint desired. The type and proportion of paint ingredients selected must provide a paint with specific processing and handling properties, as well as the desired final dry paint film properties. The major ingredients of latex paint formulations are typically a binder, an opacifying pigment, a pigment extender, and water. Common optional ingredients include defoamers, coalescents, plasticizers, thickeners, non-thickening rheology modifiers, driers, anti-skinning agents, surfactants, mildewcides, biocides and dispersants. Paint manufacturers therefore have to store a large number of paint ingredients, and change paint ingredients during manufacture, depending on the specific type of paint being prepared. Those involved in the supply chain, particularly paint retailers, have to carry large inventories of paints in order to offer a range of paints having various sheen levels, tint bases, particular end uses (i.e., exterior or interior), and various other qualities.

For decades, professional painters/contractors and do-it-yourself consumers have been able to purchase paints that are tinted at the point-of-sale rather than at the manufacturing facility. This postponement of product differentiation permits the buyer to specify the desired type of paint and select the color of the paint from a wide variety of choices rather than a limited number of colors once produced by the paint manufacturer. Product differentiation postponement also permits the paint manufacturer or seller (retail or wholesale or distributor) to minimize inventories of raw materials, intermediates and final products as well as stock outages.

Traditionally, paint manufacturers were only able to successfully employ the postponement in product differentiation to paint systems based on solution polymers. In recent times, however, systems have been developed for successful product differentiation postponement of paint components in latex polymer-based paint systems. It is considerably more difficult to formulate a stable paint when using latex emulsion polymers rather than solution polymers at least in part because of latex instability. Emulsion polymers are very sensitive to the solvents and surface active agents commonly found in paint formulations, such as surfactants, dispersants, rheology modifiers, and co-solvents. Solution polymers are by definition soluble in the solvent they are supplied in, and there is no thermodynamic driving force causing the polymer molecules to agglomerate or become unstable. In contrast, latex polymers contain the polymeric material in particles that are insoluble in water. These particles require considerable surface modifications to render them stable when supplied in an aqueous medium. If the surface modification is inadequate, the latex particles attach to one another forming a coagulated mass which then separates out of the latex paint. Paint formulating with a latex system is very difficult because the surface active materials in the formulation disrupt the delicate balance of surface forces that stabilize the latex particles in a water medium.

Within the last few years, paint formulation technology has been developed to enable the manufacture of paints from "prepaints". These technologies allow the production of a wide range of paint types from relatively few pre-formulated components, as described for example in U.S. Pat. Nos. 6,531,537; 6,921,432; 6,689,824; and United States Patent Applications having publication numbers 2003/0232913 and 2005/0038557. This enables a significant reduction in the volume and variety of inventory at the point of sale, especially if all prepaint components are supplied at the maximum solids content consistent with storage stability. Water can then be added as part of the formulating process, and does not need to be shipped or inventoried. However, this approach to making paint does introduce additional potential failure modes into the paint supply chain, which must be dealt with. Various processes and apparatus have been developed for the use of prepaints to formulate paint locally (e.g. at point of sale) in single-can lots. Nearly all of these processes and related apparatus use pumps to meter the prepaint components. Metering is either via simultaneous volumetric pumps or a sequential gravimetric process. Some sellers use a combination of the simultaneous volumetric metering and sequential gravimetric dosing, using volumetric dispensing for small-dose prepaints which need high accuracy in dispensing, and using sequential gravimetric dispensing for higher dose prepaints. The metered prepaints are mixed to form a paint, and then tinted, usually using a tinting machine.

Simultaneous metering via volumetric pumps may be used in the point of sale paint manufacturing process. This method can enable the seller to simultaneously pump all of the prepaints used to make the paint to the paint can. However, these metering pumps are disadvantageous in that they tend to apply too much shear to the prepaint components, which undesirably leads to prepaint degradation. Another disadvantage associated with metering pumps is that when the pump is controlled to provide an accurate dispensed volume, the resulting dispensing rate may be too slow, particularly where high accuracy is required. Yet another disadvantage of using metering pumps in prepaint systems is that the prepaint materials may be abrasive to the pumps, causing the pumps to lose accuracy, which undesirably diminishes the quality of the final paint.

Sequential gravimetric dosing can also be used in point-of-sale paint manufacturing processes. In this method, only one prepaint can be transferred to the paint can at any one time. A high volume pump delivers one prepaint through a valve, and into a paint can which is resting on a scale. As the prepaint flows into the paint can, the scale registers the change in weight, and it causes the valve to be closed when the desired weight has been metered into the can. Subsequent prepaints are then individually metered into the paint can in the same manner. This approach allows the use of pumps that have higher capacity and less shear than the precision metering pumps used in the simultaneous volumetric metering approach. However, a disadvantage associated with this method is that since each prepaint has to be dispensed in sequence, the total time to dispense all of the prepaints, and hence the time the customer has to wait for his paint, can still be fairly lengthy. Further, if the prepaints are delivered at their maximum solids level, this results in an increase in viscosity and shear sensitivities, causing slower flow rates, which results in further extension of the order fulfillment time. As a result of these long order fulfillment times, the paint machine efficiency tends to be low, which diminishes the economic attractiveness of this approach to making paint.

Therefore, there remains a need for a reliable method for preparing a comprehensive range of water-based paints from prepaints, that does not suffer from the deficiencies typical of alternative point of sale paint preparation methods, such as for example delays in paint preparation times. This method would also be desirable for other applications besides paint making.

U.S. Pat. No. 6,969,190 discloses an apparatus for producing an aqueous paint composition, having: a first supply reservoir; a second supply reservoir; a portable, point of sale, paint bucket associated with the first supply reservoir and the second supply reservoir; and a measuring system configured to measure a first weight amount of a first premixed aqueous composition supplied from the first supply reservoir to the portable, point of sale, paint bucket and to measure a second weight amount of a second premixed aqueous composition supplied from the second supply reservoir to the portable, point of sale, paint bucket, wherein the measuring system has a scale configured to seat the portable, point of sale, paint bucket, the measuring system is configured to recalibrate the scale before the first premixed aqueous composition is supplied and to recalibrate the scale after the first premixed aqueous composition is supplied, but before the second premixed aqueous composition is supplied.

United States Patent Application having publication number 2005/0038557 discloses a paint manufacturing method having the steps of: receiving each of a plurality of fluid prepaints at different ones of a plurality of inputs of a fluid component mixing system; determining at a computer system a first fluid prepaint ratio to produce a first base paint selected from a plurality of base paints types that can be formulated from the plurality of fluid prepaints; and mixing the plurality of fluid prepaints in accordance with the first ratio, to form at an output of the mixing system, the first base paint.

The first aspect of the invention provides a method for manufacturing paints from a set of prepaints, said method comprising the steps of: (a) providing a plurality of storage tanks each containing a prepaint, wherein each of said storage tanks is associated with a weigh tank; (b) transferring the prepaint from at least one of said storage tanks to its associated weigh tank; (c) delivering pressurized gas to at least one of said weigh tanks, and using said pressurized gas to cause the prepaint to flow out of at least one of said weigh tanks in a weigh tank exit process line; (d) weighing the contents of said at least one weigh tank using a weigh tank weighing device and determining a weigh tank weight loss; (e) transporting at least two of said prepaints through a multiple-plane valve block bearing more than one valve, each valve having have at least one mode; (f) delivering said prepaints to a paint receptacle; (g) weighing said paint receptacle to determine a paint receptacle weight gain; and (h) comparing the combined weigh tank weight losses to the paint receptacle weight gain.

The second aspect of the invention provides a paint manufacturing system comprising: (a) a plurality of storage tanks each containing a prepaint; (b) a weigh tank associated with each of said storage tanks, wherein each weigh tank has a weigh tank weighing device associated with it, and a weigh tank exit process line; (c) a system for delivering pressurized gas to each of said weigh tanks; (d) a multiple-plane valve block, wherein each weigh tank exit process line is connected to a valve on said multiple-plane valve block; (e) a paint receptacle capable of receiving prepaints from said multiple-plane valve block; and (f) a paint receptacle weighing device capable of weighing the contents of said paint receptacle.

The first and second aspects of the invention are described below in detail. The method of the invention, which is the first aspect of the invention, involves a variety of steps. The order of the steps is not important, as long as the steps are performed in an order that provides for a paint having the desired characteristics. An in-depth description of the system of the invention, which is the second aspect of the invention, is incorporated within the discussion of the method of the invention. The method and system enable the point-of-sale or point-of-use manufacture of paints from prepaints, in a manner that may provide a faster production rate and superior reliability over alternative methods. In the method of the invention, gravimetric dispensing, preferably simultaneous or near-simultaneous gravimetric dispensing is used to transfer at least some of the prepaints into a paint receptacle, such as for example, a paint can. By "gravimetric" is meant that the materials are dispensed in an amount determined by weight, as opposed to "volumetric" where materials would be dispensed by volume. By "simultaneous" is meant that at least one first prepaint and at least one second prepaint are dispensed at the same time. By "near-simultaneous" is meant that at least 25 percent, preferably at least 35 percent, more preferably at least 50 percent of at least one first prepaint is dispensed while at least one second prepaint is being dispensed.

Sequential dispensing methods suffer from the disadvantage of having an extended dispensing time which equals at least the sum of the dispensing times of the individual prepaints, plus the time required for the paint receptacle to stabilize between doses. Simultaneous dispensing methods, on the other hand, may have a dispensing time that is only as long as the time to dispense the slowest prepaint, which minimizes the time a customer must wait for their order to be fulfilled, and may substantially increase the maximum output of the paint making system.

In the first aspect of the invention, the prepaints are stored in a plurality of storage tanks, with each prepaint being stored in its own tank. The storage tank may be any container which is suitable for storing sufficient prepaint to satisfy the paint seller or paint maker's supply needs, such as for example, the container in which the prepaint was delivered or the container to which it was transferred upon delivery, which container may be for example a drum, tote, tank, and the like. Each storage container may contain a single prepaint. The number of storage tanks is dependent upon the number of prepaints required to make the particular sellers' range of paints. The prepaints may be of any type suitable for making the desired range of paints, such as for example, the prepaints of U.S. Pat. Nos. 6,531,537; 6,921,432; 6,689,824; 7,065,429 and United States Patent Application having publication number 2003/0232913, which enable manufacture of a range of paints. "Prepaints" may include not only polymer or opacifier emulsions or dispersions and the like, but also other paint components that are traditionally known as additives, such as for example rheology modifiers, thickeners, biocides, coalescents, and the like.

Each prepaint storage tank is associated with a prepaint weigh tank. By "associated with" is meant that each storage tank has a process line exiting the storage tank, which process line is capable of feeding into a weigh tank. Preferably, each storage tank feeds a different weigh tank. The storage tank process line may either feed directly into the weigh tank or it may feed into a different process line that is capable of feeding into the weigh tank, such as for example a process line downstream of the weigh tank. The storage tank process line may be any type of conduit suitable for transferring prepaint from the storage tank to the weigh tank, such as for example plastic or metal piping or tubing, flexible hose, and the like. In a preferred embodiment, an acrylonitrile butadiene styrene (ABS) pipe or small stainless steel tubing may be used. The desired level in the weigh tank is maintained by transferring, when necessary, prepaint from the storage tank, through the storage tank process line, and into the weigh tank. The transfer of the prepaint into the weigh tank may be performed by a pump, preferably a high volume pump. When it is desired to make a paint using the prepaints, it is preferred that the weigh tank level is checked to ensure that each prepaint that is needed for the particular recipe is present in the weigh tank in a sufficient amount to make the desired recipe. If it is determined that the level in any weigh tank must be increased, this may be achieved by pumping the applicable prepaint out of the storage tank, through the process line from the storage tank to the weigh tank, and into the weigh tank. The weigh tank level check and pumping may be performed automatically by a computer.

Each weigh tank has a weighing device associated with it. By "associated with it" is meant that the weigh tank has under, on or over it a weighing device that is capable of measuring the weight of the material in the weigh tank. Examples of suitable weighing devices include, for example, scales, load cells, and the like. The use of the weigh tank weighing device may enable superior performance and accuracy over alternative paint making systems, in part because when used in combination with the paint receptacle weighing device, it may provide for enhanced accuracy and reliability of prepaint dispensing.

Each weigh tank has a system for delivering pressurized gas to the weigh tank. Transfer of prepaints by pressure, rather than pumping, is advantageous, in part because it eliminates the risk that the pump may degrade the prepaints by applying excess shear. Any suitable pressurized gas system may be used. Preferably, the gas is a moisture-saturated gas that can control drying of the materials to be dispensed, such as for example, saturated air. In one embodiment of the invention, the system may be a gas line attached to the weigh tank which delivers pressurized gas from a compressor such as for example an air compressor, or other source of pressurized gas. The gas line may be for example a polyvinyl chloride or metal piping, flexible hose, or other conduit suitable for delivering a gas to the weigh tank. The pressurized gas may be used to put pressure on the prepaint within the weigh tank, causing the prepaint to flow out of the weigh tank. In order for the prepaint to exit the weigh tank, any valves on the weigh tank exit line must be at least partially open. The pressurized gas may or may not be used to cause the prepaints to flow through a recirculation line. Use of a recirculation line may be desirable to prevent settling of prepaint components in the system. In a preferred embodiment, the prepaints are stable, and thus do not have a need for a recirculation system for purposes of prevention of settling, although a recirculation system may be advantageous for purposes of purging air or other gas from the system.

Each paint may have associated with it a recipe for making the paint from more than one prepaint. The type and amount of prepaint required for each paint varies depending on the desired paint characteristics. In a preferred embodiment of the invention, the paint recipes may reside in a computer. In this embodiment, the desired paint may be selected by a computer user by selecting, for example, a paint name or type, desired paint properties, a paint recipe name, or any other type of paint identifier. In this embodiment, when the desired paint is selected, the computer determines the appropriate recipe for preparing the paint. In this and other embodiments, the computer may also control valves on the process lines exiting the weigh tanks, and/or control the flow of pressurized gas to the weigh tanks. Therefore, the computer may control not only the type of prepaints released into the paint receptacle, but also the flowrate under which the prepaint is released from the weigh tank. The computer may also be in communication with the weighing devices on the weigh tanks. The computer may automatically (continually or periodically) receive the weight in each weigh tank as the prepaint is transferred out of the weigh tank. When the computer detects that the weight transferred from the weigh tank is approaching the weight called for by the paint recipe, the computer may control the valve on the weigh tank exit, causing the valve to close.

When the prepaint leaves the weigh tank, it is transported from the weigh tank in a weigh tank exit process line. This process line may be any type of conduit suitable for transferring prepaint from the weigh tank to the paint receptacle, such as for example plastic or metal piping or tubing, flexible hose, and the like. In a preferred embodiment, an acrylonitrile butadiene styrene (ABS) pipe or small stainless steel tubing may be used. The weigh tank exit process line delivers the prepaint to a valve that discharges the prepaint into a paint receptacle. Preferably the valve is one of several on a multiple-plane valve block. It is common in dispenser design to mount the dispensing valves on a flat plate (in other words, a single-plane valve block) located above the container to be filled. However, this arrangement limits the number of valves of a certain size that may be fit into a limited space, such as for example a paint can opening, on a flat plane. By "multiple-plane" valve block is meant a valve block that offers increased surface area because its shape provides more planes than a simple flat plate. The increased surface area (versus a flat plate) offers room to mount a greater number of valves which may all discharge into the same container opening. Shapes suitable for this type of valve block can include, for example hollow pyramids, hollow truncated pyramids, hollow half-shapes of octahedrons, dodecahedrons and the like.

When paints are being manufactured from prepaints, in order to make a broad range of paints in one system, including the full range of sheens (matte, eggshell, semigloss, high gloss) weatherability (indoor versus outdoor) scrubability, hiding power and other characteristics and features of various paints, as many as 16 or more prepaints may be required for the system, although most recipes will require fewer prepaints, usually from 3 to 8 prepaints, for a single paint. This means that for a paint making system including 16 prepaints, there may be 16 weigh tanks each having a weigh tank exit line, each of which leads to a valve. Therefore there may be 16 valves on a single valve block. One could fit 16 dispensing valves into a flat plate valve block arrangement, however such an arrangement would be too large to discharge all of the valves into a 150 mm paint receptacle opening, which is the typical diameter of a 5 liter paint can. Others (see for example U.S. Pat. No. 6,991,004) have used valve block designs that use a conical section to allow aiming all dispensing valve streams at a single point in the paint can. However, the shallow cone used in the U.S. Pat. No. 6,991,004 patent does not afford much additional area for mounting additional valves. Also, when a simultaneous dispensing process is used, such targeting of the dispensing valve streams is likely to undesirably cause splashing, due to concentration of the hydrodynamic energy of the dispensing valve streams in one location. The use of a multiple-plane valve block diminishes the above-mentioned problems, particularly where all of the valves are aimed at slightly different locations in the paint receptacle.

The use of the multiple-plane valve block enables the use of an exceptionally large number of dispensing valves, preferably up to 16 although it could be more, to be located over a single paint receptacle opening.

Multiple-plane valve blocks do not require the presence of a flow conduit (e.g. pipe or hose) downstream of the dispensing valve. Such conduits are not preferred as they may cause accumulation of prepaint on the walls of the conduit, thereby negatively affecting the accuracy of the amount of prepaint discharged into the paint receptacle. Another disadvantage of the presence of conduits downstream of the dispensing valve is that prepaints would tend to dry in the open-ended flow conduits downstream of the valves, potentially forming a skin that could be swept into the paint dispensed into a paint receptacle in a subsequent paint making session. The use of a multiple-plane valve block without conduits downstream of the dispensing valves may enable avoidance of these problems, while allowing the use of a large number of dispensing valves.

In a preferred embodiment of the invention, the valves on the multiple-plane valve block may have multiple modes, such as for example a high rate, a low rate, and a "jog" or "drop" mode. Valves of this type are commercially available from suppliers such as for example Novaflow, located in Ontario, Canada. In this embodiment, when in the low rate mode, the valve controller may cause the valve to open a small port, allowing a limited flow rate of material pass through the valve. Alternatively, when in the high rate mode, the controller may open a different, much larger port allowing a high flow of material through the valve. In the "jog" or "drop" mode, a small port may be opened and closed briefly, just long enough for a minimal amount to be dispensed, for example, a single drop of material. Multiple modes are advantageous because accuracy is extremely important in making many paints. Accuracy may be a function of how quickly the weighing device responds to changes in weight, how fast mechanical systems can respond to control signals, and/or how much material flows while valves are closing, among other things. It is useful to have the ability to flow the prepaint at a high rate initially, using the "high rate" mode, and then when the majority of the prepaint has been dispensed, switch the valve to the small "low rate" port, which may be closed when sufficient prepaint has been dispensed. If accuracy is extremely critical, the last percent of a dose may be dispensed using the "jog" mode.

In a different embodiment of the invention, further control of the prepaint flowrate may be achieved by modulating the multiple-mode dispensing valve. By "modulating" is meant that the dispensing valve may be partially opened or partially closed during dispensing of the prepaint into the paint receptacle.

In another preferred embodiment of the invention, the pressure in the weigh tank may be adjusted, enabling an even greater range of adjustment in the flowrate of prepaint being dispensed. In this embodiment, the high shear that prepaints would normally see using the small "low rate" port of the multiple-mode valve may be reduced, since the reduced pressure which may be used at the end of the dispensing cycle may yield a reduced flow rate through the valve, desirably resulting in lower velocity and lower shear. Another advantage associated with varying the pressure is that it enables adjustment of the time required for a dose of a prepaint to be dispensed. This means that in many cases the pressure on the weigh tanks may be adjusted so as to coordinate the dispensing time of the prepaints, so that each prepaint takes the same or substantially the same amount of time to dispense into the paint receptacle. For example, the flowrate of a small dose dispensed at a low rate may be adjusted to take as long as a large dose dispensed at high rate. As a result, the prepaints may experience some premixing during dispensing, which would not happen if there were a wide range of dispensing times for each of the prepaints. This adjustment and/or coordination of dispensing time would be difficult to achieve if the only variable one could change were selection of the port of the dispensing valve.

In another embodiment of the invention, an anti-splash cup may be located between the multiple-plane valve block and the paint receptacle. By "anti-splash cup" is meant a cup having on its bottom surface a perforated plate or screen. The use of the anti-splash cup is advantageous in that it provides a splash shield, reducing the amount of prepaints that may splash on the paint receptacle walls. In addition, the cup may provide some pre-mixing of the prepaints before and/or while they enter the paint receptacle, since the cup tends to drain slightly slower than the dispensing rate, and it may build some inventory of each of the prepaints prior to discharging into the paint receptacle. Further, the small holes in the cup may retain some water from the final rinse of the paint manufacturing system, thereby sealing in humidity in the dispensing area and minimizing drying at the tips of the dispensing valves.

The prepaints are discharged into a paint receptacle. By paint "receptacle" is meant any container suitable for receiving the prepaints used to make the paint. In one embodiment of the invention, the receptacle is a paint can. In a preferred embodiment of the invention, while the prepaints are discharged into the paint receptacle, the weight of the paint receptacle containing the prepaints may be measured. The paint receptacle weight may be measured by any suitable device, such as for example a scale, load cell and the like. In this embodiment, the measured weight may be transmitted to a computer. In this embodiment, to ensure the accuracy of the weight of the discharged paint, the computer may compare the paint receptacle weight gain to the combined weight loss of the weigh tanks. Preferably the comparison may be performed automatically, either continually or periodically. This procedure may provide for superior accuracy and reliability over alternative dispensing systems.

In one embodiment of the invention, as long as the computer determines that the paint receptacle weight gain equals the combined weigh tank weight loss, the system will continue to operate normally. If there is a discrepancy between the paint receptacle weight gain and the combined weigh tank weight loss, action may be taken. In one embodiment of the invention, such a discrepancy may result in notification of the discrepancy to the paint maker. In a preferred embodiment of the invention, the discrepancy may also result in an adjustment in the process for the next paint manufacturing session, whereby the prepaints are dispensed individually, rather than simultaneously. This adjustment may be made either manually or automatically. Preferably it is made automatically. By switching to individual dispensing, it becomes possible to determine the source of the malfunction. In a different embodiment of the invention, after determination of the source of the weight discrepancy, the system may be adjusted so that all of the prepaints may be dispensed simultaneously or near-simultaneously from the weigh tanks whose systems are operating correctly, while the prepaint whose system caused the weight discrepancy may be dispensed individually, using the paint receptacle weighing device to determine when the correct amount of that particular prepaint has been dispensed. In this embodiment, it is preferred that the prepaint having the malfunctioning dispensing system be dispensed after the other prepaints have been dispensed. Although operating under this embodiment may result in a slightly longer production time than is achievable when the system is operating correctly, it may enable the paint maker to continue operation without substantial delays and without loss of accuracy of prepaint dispensing. The ability to continue operations without significant delay is advantageous over sequential gravimetric dispensing processes in which the paint maker does not typically know about a malfunction in the weighing system until the paint receptacle overflows.

In some cases, the prepaints may have relatively high solids levels. Such prepaints are desirable, in part because they may have lower shipping costs and require less warehousing space. High solids prepaints may require the addition of water during preparation of the paint. It is contemplated that the method and system of the invention may provide for addition of water to the paint. In one embodiment of the invention, the water may be fed to the paint receptacle after the prepaints have been dispensed. In this embodiment, a spray nozzle may be used to feed the water, preferably while at the same time washing the prepaint dispensing valves clean of any material that might not have been dispensed into the paint receptacle. This wash may aid in ensuring that all or mostly all of the prepaint called for by the recipe is dispensed into the receptacle, rather than remaining in the dispensing lines. This may provide for a higher quality paint product, and may prevent or minimize cross contamination of the paint products. In addition, in one embodiment of the invention, if there is a compatibility problem between some of the prepaints in their pure form, a "two stage" addition of prepaints may be made, whereby the majority of prepaints may be dispensed individually, or preferably, simultaneously or near-simultaneously, and then the prepaint causing a problem can be dispensed with the initial portion of the water flush, diluting the prepaint, and rendering a problem with the other prepaints less likely.

The paint that is dispensed into the paint receptacle, the "base paint", may or may not contain a coloring agent, such as for example a tint. In one embodiment of the invention, a coloring agent may be added to the paint receptacle, preferably by a coloring agent dispensing machine, such as for example a tinting machine. Suitable tinting machines are commercially available, such as for example Topflow Tinting dispenser, manufactured by Coloriance, located in Italy. In one embodiment of the invention, a manual or automated conveying system may be used to transport the base paint to the coloring agent dispensing machine. In a different embodiment of the invention the same or a different computer may control the prepaint dispensing, the transfer of the paint receptacle to the coloring agent dispensing machine, and/or dispensing of the coloring agent into the base paint within the paint receptacle. In yet another embodiment of the invention, the computer may also handle at least one of inventory control, reorder generation, and automated diagnosis of the control systems.

There may be situations where it is desirable not to discharge all of the prepaints in the same discharging cycle, for example, when a material in of one prepaints is not compatible with a different material in of a different prepaint. In such situations, it may be useful to dispense the sensitive materials separately. In one embodiment of the invention, the prepaints may be discharged in more than one cycle. By this is meant that one set of prepaints may be discharged individually, or preferably simultaneously or near-simultaneously in a first cycle, while at least one other set of prepaints may be discharged individually, or preferably simultaneously or near-simultaneously in at least one subsequent cycle. Any of these sets may contain one or more prepaints. Where more than one cycle of simultaneous or near-simultaneous dispensing is used, it should still be possible to achieve a faster cycle time than is obtainable by alternative discharging methods.

In a different embodiment of the invention, a webcam may be used to enable inspection of the paint making system. For example, one or more web cams may be used for remote visual inspection and/or recordation of the dispensing valve operation, remote viewing of the paint receptacle conveying system, or any other aspect of the paint making operation. The webcam images may be transmitted to and/or displayed on a computer or television screen. This use of webcams may be especially useful in remotely assisting in the diagnosis of operating problems in the system, and may be particularly useful in providing operation and maintenance support from a remote location.

For purposes of promoting an understanding of the principles of the invention, reference will be made to the exemplary embodiments illustrated in the drawings, and specific language will be used to describe the same. It will nevertheless be understood that no limitation of the scope of the invention is thereby intended.

Figure 1:
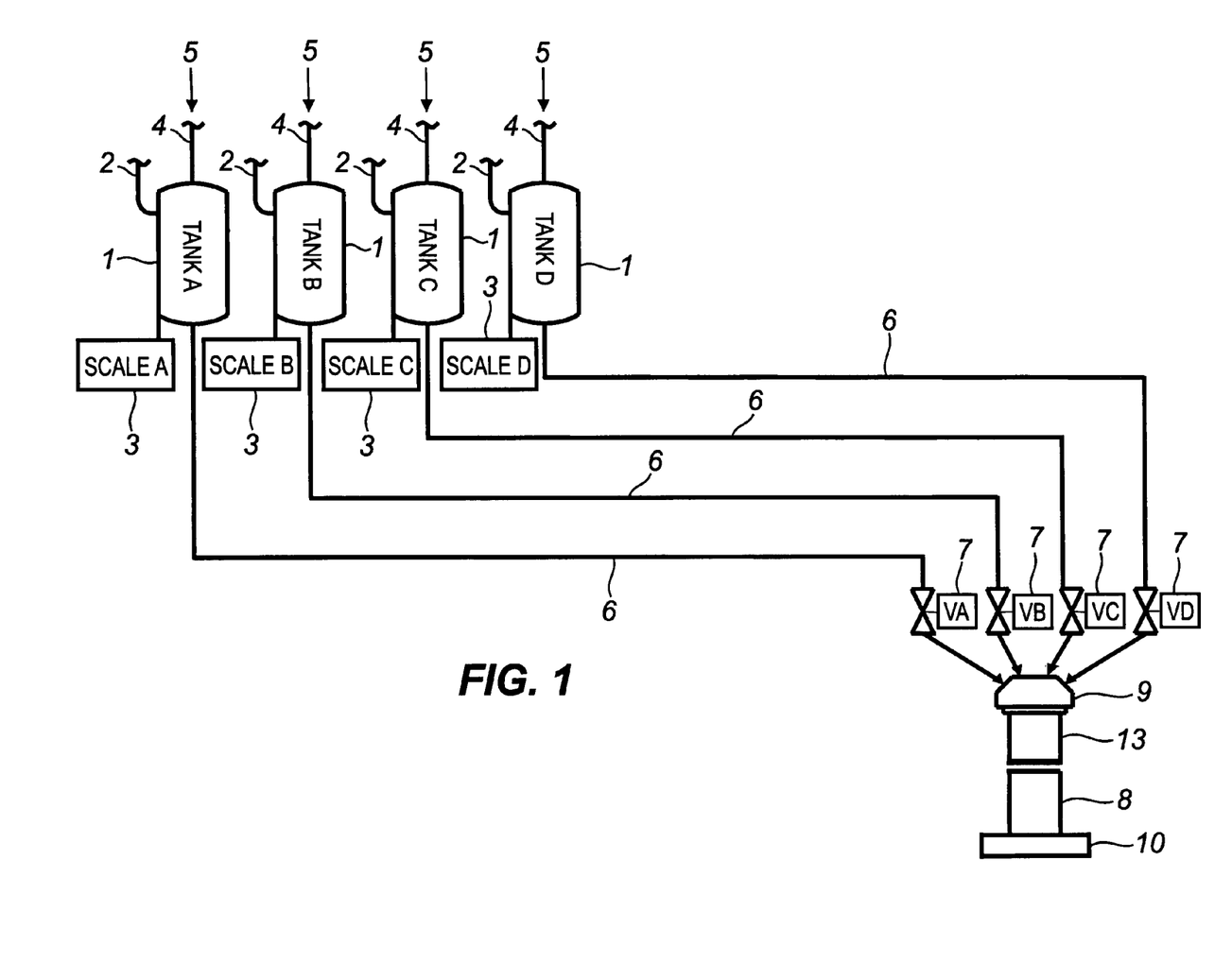
FIG. 1 is a process flow diagram of a paint making system.

FIG. 1 shows a process flow diagram of a simultaneous gravimetric dispensing system according to one embodiment of the second aspect of the invention. The system of this embodiment of the invention has up to sixteen weigh tanks 1, of which four are shown in FIG. 1. Each weigh tank 1 has leading to it a process line 2 from a storage tank. Each of the weigh tanks 1 contains a prepaint that has been pumped into the weigh tank 1 by a high volume pump located on the process line 2 from the storage tank. Each of the weigh tanks 1, has a weighing device (in this embodiment a scale) 3 on it. The scale 3 weighs the contents of the weigh tank 1. Attached to each weigh tank 1 is a conduit (in this embodiment a flexible hose) 4, capable of carrying pressurized gas 5 to the weigh tank 1. Connected to the bottom surface of each weigh tank 1 is a weigh tank exit process line 6. Downstream of weigh tank 1, on each weigh tank exit process line 6, is a valve 7 capable of discharging into a paint receptacle (in this embodiment, a paint can) 8. Each valve 7 is mounted on the multiple-plane valve block 9. Beneath the paint receptacle 8 is a weighing device (in this embodiment, a scale) 10, which is capable of weighing the contents of the paint can 8. In one embodiment of the first aspect of the invention, when a computer user inputs a paint selection in a computer, the computer determines which prepaints are required for the recipe to prepare the paint. In this embodiment, the computer causes pressurized gas 5 to flow into the weigh tanks 1 containing the required prepaints, and opens the valves 7 downstream of these weigh tanks 1, causing the prepaints to leave the weigh tanks 1 through the weigh tank exit process lines 6, and flow simultaneously into the paint can 8, through the dispensing valves 7 mounted on the multiple-plane valve block 9. The computer controls the flowrate of the prepaints, by controlling the pressure of the gas 5 in the weigh tanks 1, and the opening of the valves 7 on the multiple-plane valve block 9, so that the discharge time of each prepaint is approximately the same. In this embodiment, for those prepaints that are used in large quantities in the recipe, the computer sets the valves 7 to a high rate mode, and for those prepaints used in small quantities, the computer sets the valves 7 to a low rate mode. During the prepaint discharge process, the computer automatically receives the weights of weigh tanks 1, calculates the weight losses of the discharging weigh tanks 1, and adds the weight losses to determine a combined weigh tank 1 weight loss. Additionally, in this embodiment, during the prepaint discharge, the computer receives the weight of the paint can 8 from the scale 10, and calculates the paint can 8 weight gain. The computer discontinues feeding of each prepaint when the amount of each prepaint called for by the paint recipe has been reached. The computer also compares the combined weigh tank 1 weight loss and paint can 8 weight gain to ensure the accuracy of the charge.

Figure 2:
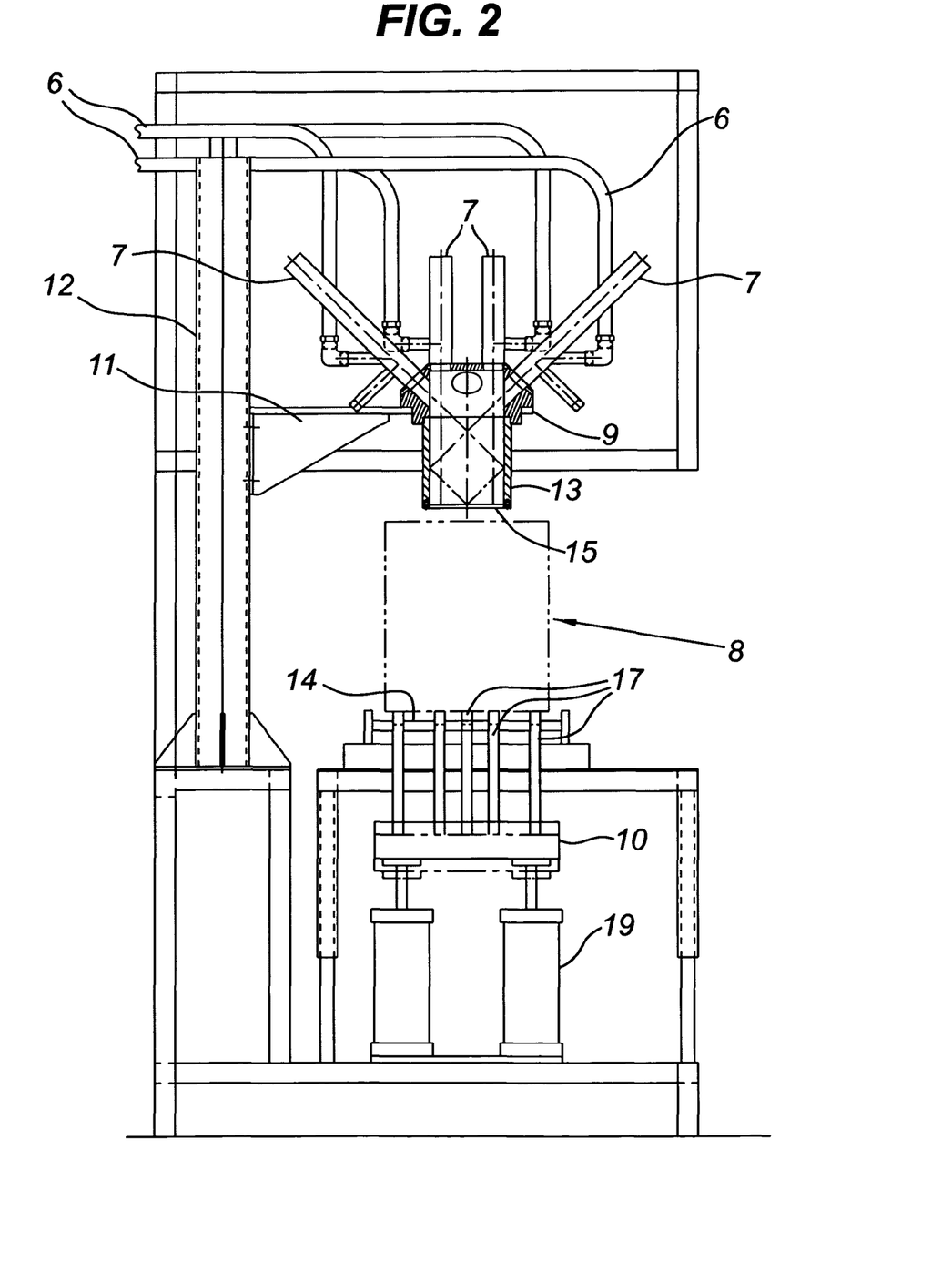
FIG. 2 is a side perspective of a portion of a dispensing system, downstream of a plurality of weigh tanks.
Figure 3:
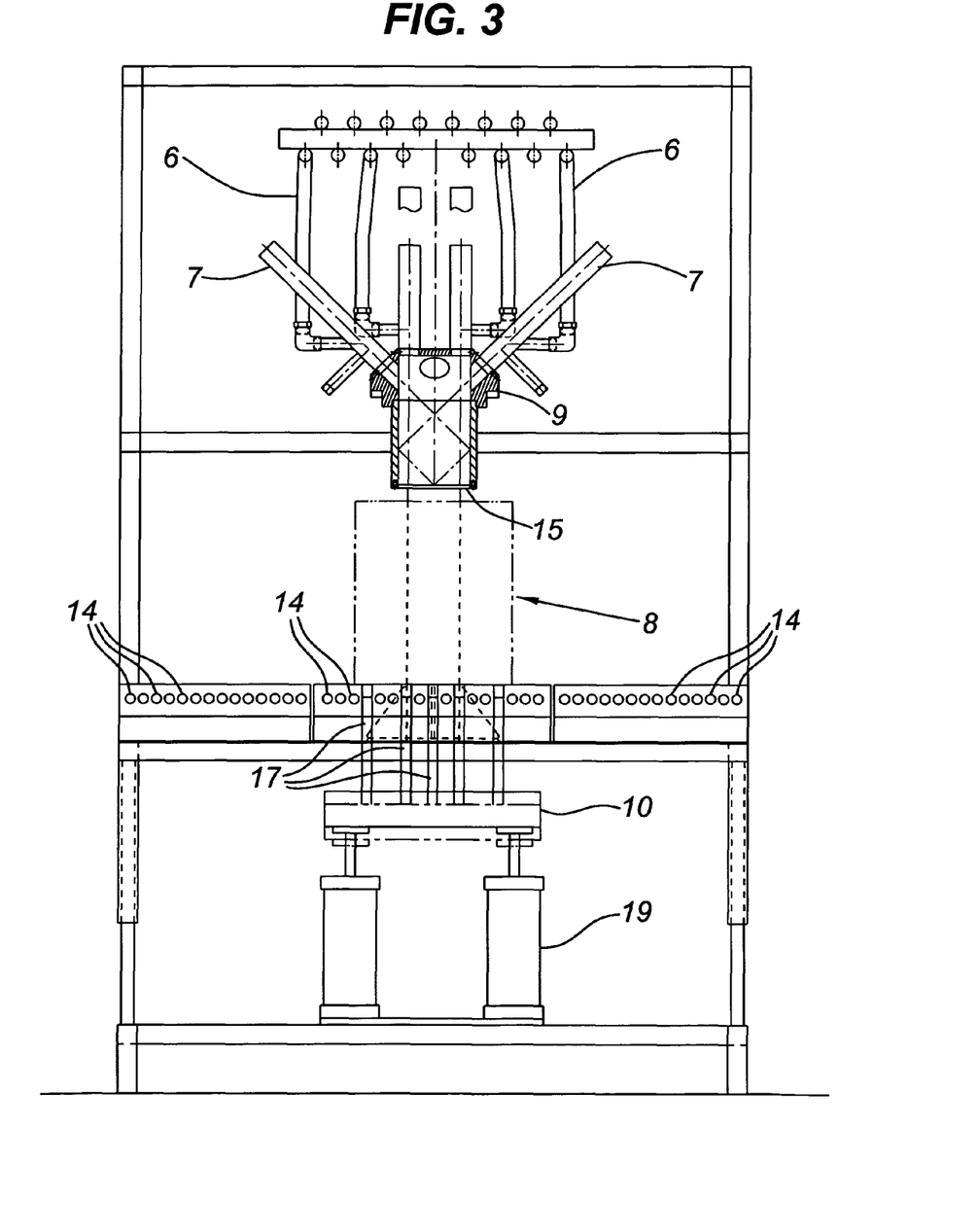
FIG. 3 is a front perspective of a portion of a dispensing system, downstream of a plurality of weigh tanks.

FIG. 2. and FIG. 3. show one embodiment of the portion of the dispensing system of the second aspect of the invention, downstream of the weigh tank 1. FIG. 2. shows a side perspective, while FIG. 3 shows a front perspective. In this embodiment, each of sixteen weigh tank exit process lines 6 leads to a valve 7, each of which is attached to the multiple-plane valve block 9. The multiple-plane valve block 9 is supported, for example by a bracket 11 that is attached to a support column 12. In this embodiment, beneath the multiple-plane valve block 9 of this invention is an anti-splash cup 13. When, according to one embodiment of the first aspect of the invention, prepaints flow from the weigh tank exit process lines 6, and through their respective valves 7 on the multiple-plane valve block 9, the prepaints are discharged into an anti-splash cup 13 having perforations 16 (see FIGS. 4 and 6) in its bottom surface 15. The perforations 16 cause some of the prepaint to accumulate in the cup 13 prior to draining through the anti-splash cup perforations 16, resulting in some pre-mixing of the prepaints. In this embodiment, the prepaints flowing through the cup perforations 16 are discharged into the paint can 8. FIG. 2 shows the paint can resting on the lift pins 17 of a weighing device (in this embodiment, a scale) 10. In this embodiment, the scale may be lifted by an elevating device 19, for example, air cylinders 19, causing the scale pins 17 to raise the paint can 8 above the roller conveyor 14, and thereby enabling the scale 10 to measure the weight of the paint can 8. FIG. 3. shows the paint can resting on a roller conveyor 14 that is used in this embodiment to transport the paint can 8 containing the paint to a tinting machine for coloring of the paint.

Figure 4:
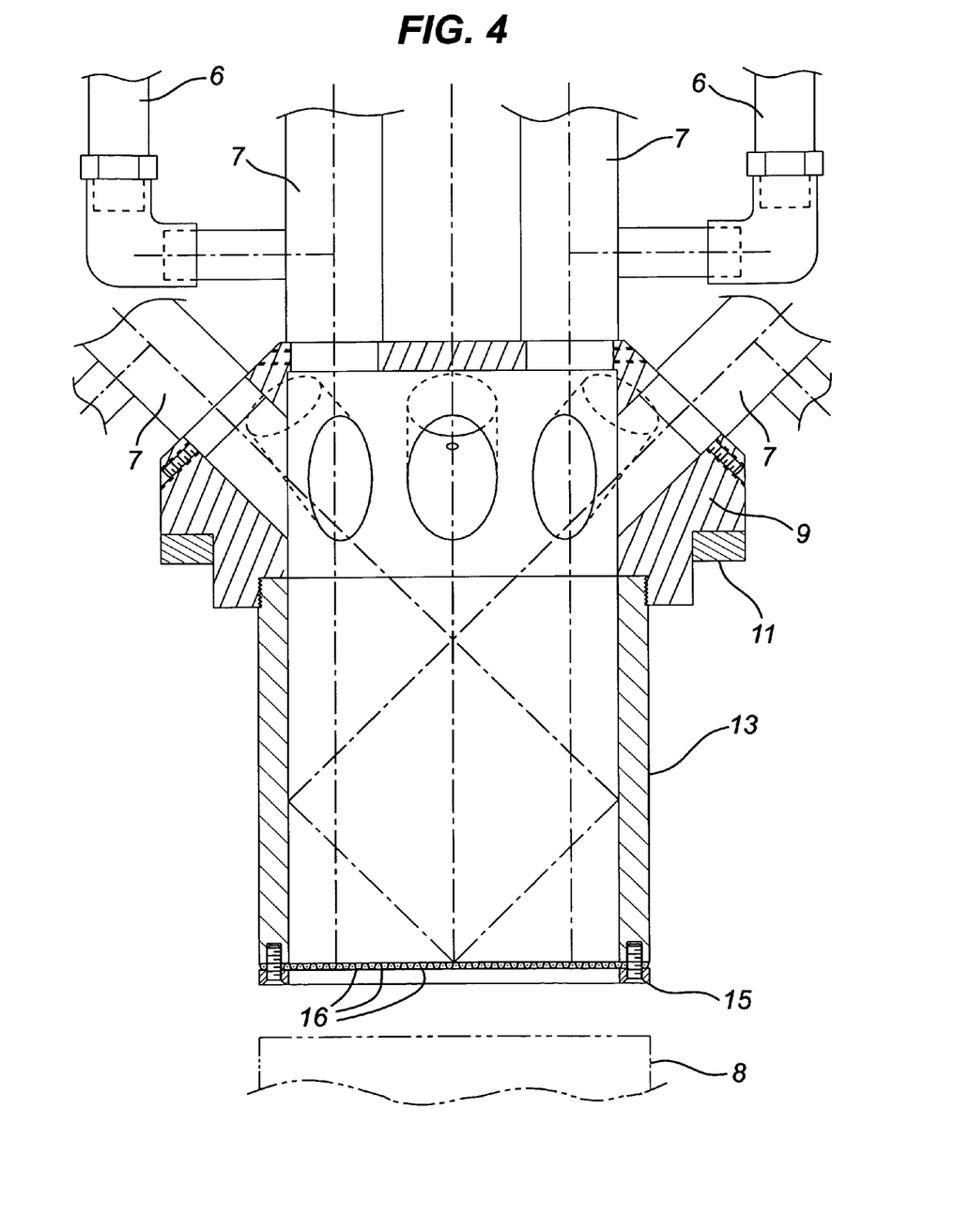
FIG. 4 and FIG. 5 are front perspectives of a multiple-plane valve block.
Figure 5:
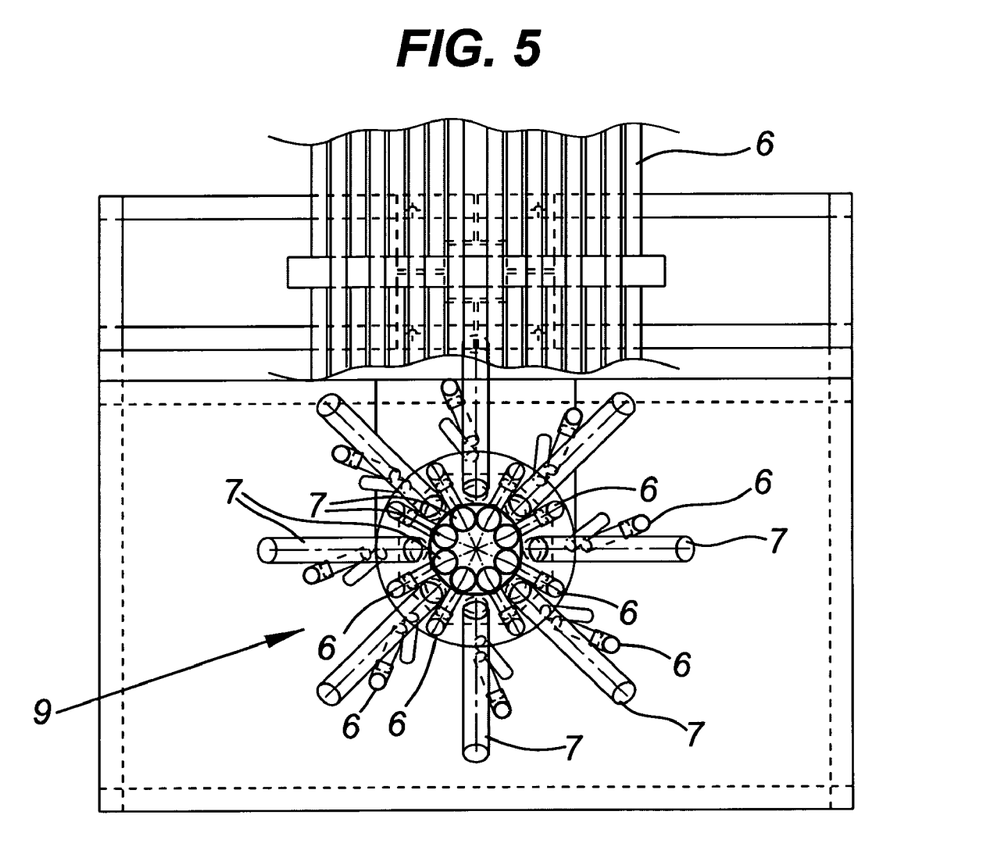
Figure 6:
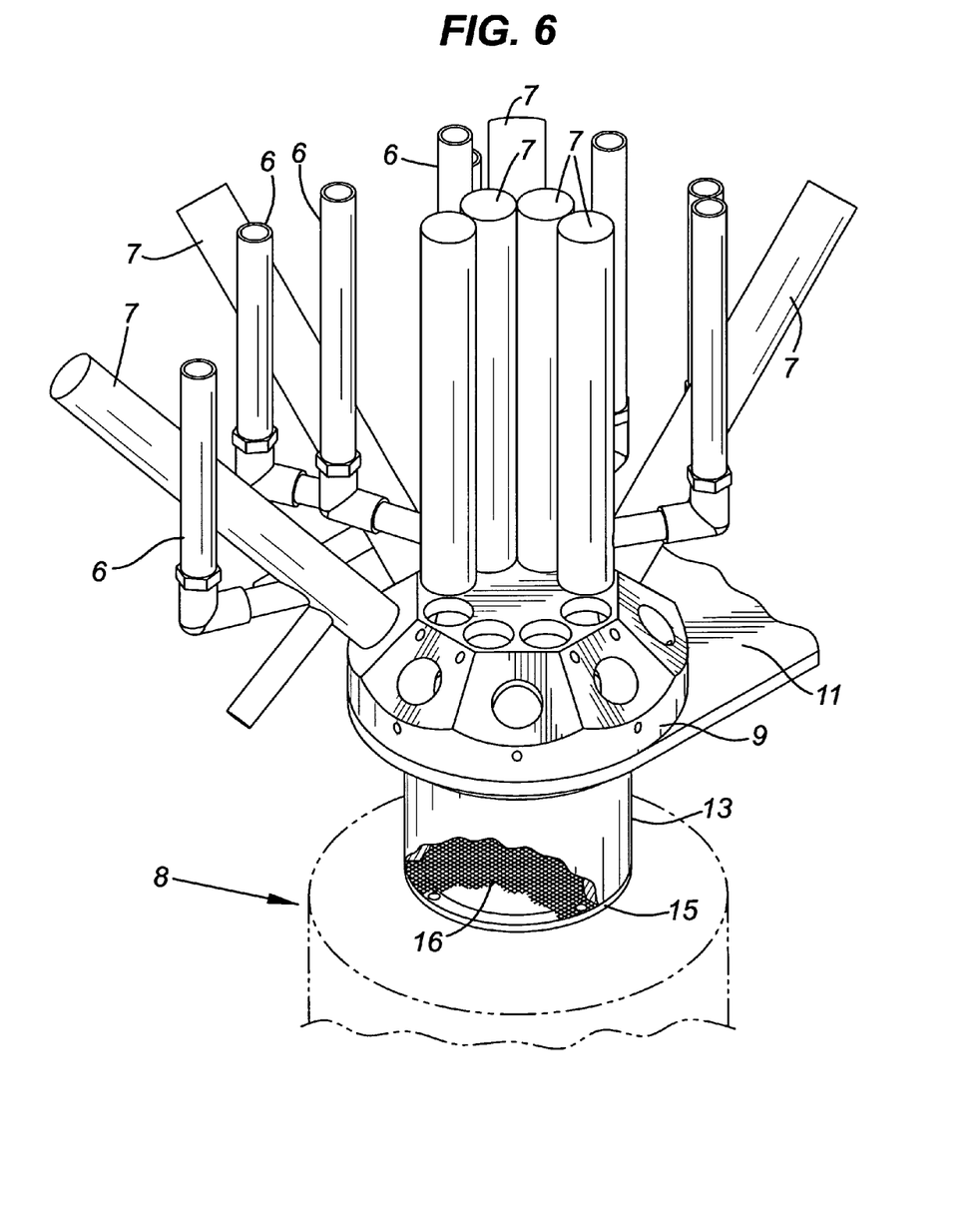
FIG. 6 is a top perspective of multiple-plane valve block.

FIGS. 4, 5 and 6 show details of a multiple-plane valve block according to one embodiment of the second aspect of the invention. FIGS. 4 and 6 show a front perspective of the multiple-plane valve block 9, while FIG. 5 shows a top perspective of the valve block 9. Also shown in FIGS. 4 to 6 are some of the weigh tank exit process lines 6 leading to the valves 7 on the valve block 9 of this embodiment. FIGS. 4 and 6 show an anti-splash cup 13 beneath the valve block 9, and the perforations 16 in the bottom surface 15 of the anti-splash cup.

We claim:

1. A method for manufacturing paints from a set of prepaints, said method comprising the steps of:
    (a) providing a plurality of storage tanks each containing a prepaint, wherein each of said storage tanks is associated with a weigh tank;
    (b) transferring the prepaint from at least one of said storage tanks to its associated weigh tank;
    (c) delivering pressurized gas to at least one of said weigh tanks, and using said pressurized gas to cause the prepaint to flow out of at least one of said weigh tanks in a weigh tank exit process line;
    (d) weighing the contents of said at least two weigh tanks using a weigh tank weighing device and determining a weigh tank weight loss for each of the weigh tanks;
    (e) transporting at least two of said prepaints through a multiple-plane valve block bearing more than one valve, each valve having have at least one mode;
    (f) delivering said prepaints to a paint receptacle;
    (g) weighing said paint receptacle to determine a paint receptacle weight gain; and
    (h) adding said weigh tank weight losses to determine a combined weigh tank weight loss, and comparing the combined weigh tank weight losses to the paint receptacle weight gain.

2. The method according to claim 1 wherein said prepaints are transported simultaneously or near-simultaneously through said multiple-plane valve block.

3. The method according to claim 1 wherein said method further comprises the step of adjusting the flowrate of said prepaint exiting said weigh tank by adjusting the pressure of said pressurized gas.

4. The method according to claim 1 wherein said method further comprises the step of s discharging one set of said prepaints in a first cycle, and discharging at least one second set of said prepaints in at least one subsequent cycle.

5. The method according to claim 1 wherein said method further comprises the step of discharging said prepaint from said multiple-plane valve block into an anti-splash cup that discharges into said paint receptacle.

6. The method according to claim 1 wherein said method further comprises the step of modulating at least one of said valves.

7. The method according to claim 1 wherein said method further comprises the step of using a computer to receive images from a webcam directed toward at least part of a location in which said method is performed.

8. The method according to claim 1 wherein said method further comprises the step of using a computer to perform at least one of:
    (a) receiving from said weigh tank weighing devices the weight of said weigh tanks, and determining said weigh tank weight losses;
    (b) adding said weigh tank weight losses to determine a combined weigh tank weight loss,
    (c) receiving from said paint receptacle weighing device the weight of said paint receptacle, and determining said paint receptacle weight gain; and
    (d) comparing said combined weigh tank weight loss to said paint receptacle weight gain.

9. The method according to claim 8 wherein said method further comprises the step of using said computer to discontinue the flow of a prepaint into said paint receptacle when said weigh tank weight loss equals or substantially equals the prepaint weight required by a recipe.

10. The method according to claim 1 wherein said method further comprises the steps of using a computer to:
    (a) detect errors in the operation of said weigh tank weighing device or said paint receptacle weighing device;
    (b) make a subsequent paint using a sequential dispensing method to determine the source of said error; and optionally,
    (c) make a subsequent paint using a sequential dispensing method in combination with a simultaneous dispensing method.

11. A paint manufacturing system comprising:
    (a) a plurality of storage tanks each containing a prepaint;
    (b) a weigh tank associated with each of said storage tanks, wherein each weigh tank has a weigh tank weighing device associated with it, and a weigh tank exit process line;
    (c) a system for delivering pressurized gas to each of said weigh tanks;
    (d) a multiple-plane valve block, wherein each weigh tank exit process line is connected to a valve on said multiple-plane valve block;
    (e) a paint receptacle capable of receiving prepaints from said multiple-plane valve block; and (f) a paint receptacle weighing device capable of weighing the contents of said paint receptacle.

12. The system according to claim 11 wherein said system further comprises at least one webcam.

13. The system according to claim 11 wherein said system further comprises at least one computer capable of at least one of:
  (a) receiving from said weigh tank weighing devices the weight of said weigh tanks, and determining said weigh tank weight losses;
  (b) adding said weigh tank weight losses to determine a combined weigh tank weight loss,
  (c) receiving from said paint receptacle weighing device the weight of said paint receptacle, and determining said paint receptacle weight gain; and
  (d) comparing said combined weigh tank weight loss to said paint receptacle weight gain.

14. The system according to claim 11 wherein the pressure of said pressurized gas is adjustable.

15. The system according to claim 11 wherein said multiple-plane valve block discharges into an anti-splash cup that discharges into said paint receptacle.

* * * * *